United States Patent

[11] 3,603,022

[72] Inventors  Robert G. Asher;
  Frances E. Asher, both of 429 Elwood St.,
  P.O. Box 168, Sterling, Colo. 80751
[21] Appl. No.  841,481
[22] Filed  July 14, 1969
[45] Patented  Sept. 7, 1971

[54] INSECT AND RODENT BAND
  10 Claims, 7 Drawing Figs.
[52] U.S. Cl. .................................................. 43/131
[51] Int. Cl. ............................................... A01m 1/20
[50] Field of Search ......................................... 43/131,
  124, 129, 132, 108, 109; 280/421; 296/23

[56]  References Cited
  UNITED STATES PATENTS
2,808,679  10/1957  Collins ............................ 43/131
2,856,724  10/1958  Bodenbach et al. ........... 43/131
2,862,758  12/1958  Robertson ..................... 296/23

*Primary Examiner*—Warner H. Camp
*Attorneys*—Clarence A. O'Brien and Harvey B. Jacobson ABSTRACT: A band of absorbent material for holding insecticide and/or rodent repellent is disposed about a tubular section interposed in an associated sewer line and the tubular section includes structure on its opposite ends defining outstanding circumferential channels opening toward each other within which the axial ends of the band are seated. One of the structures defining a circumferential channel is axially removable from the associated end of the tubular member whereby the band may also be axially removed from the tubular member and replaced or again soaked in insecticide and/or rodent repellent.

PATENTED SEP 7 1971
3,603,022
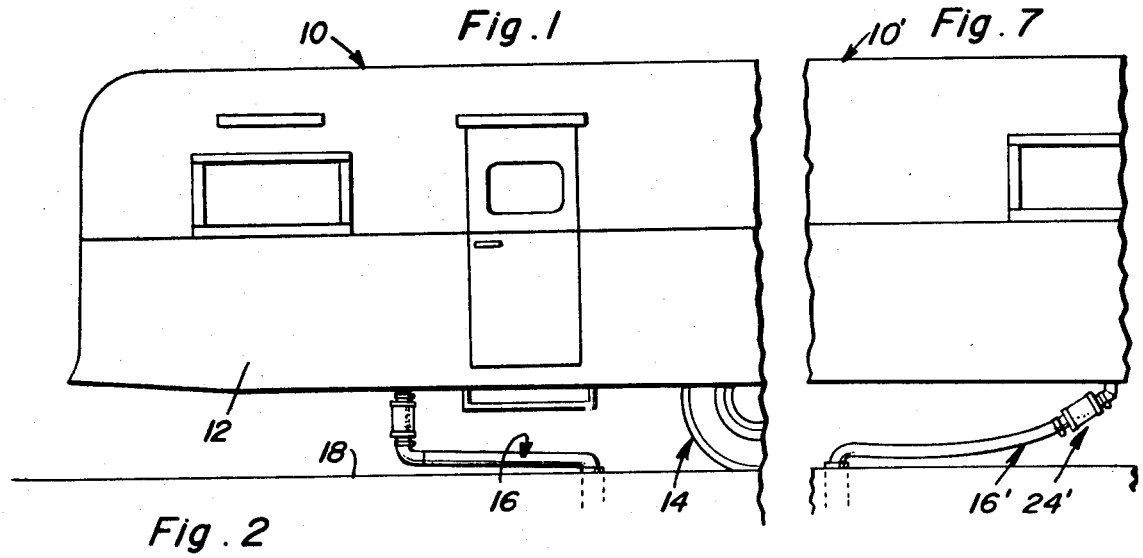
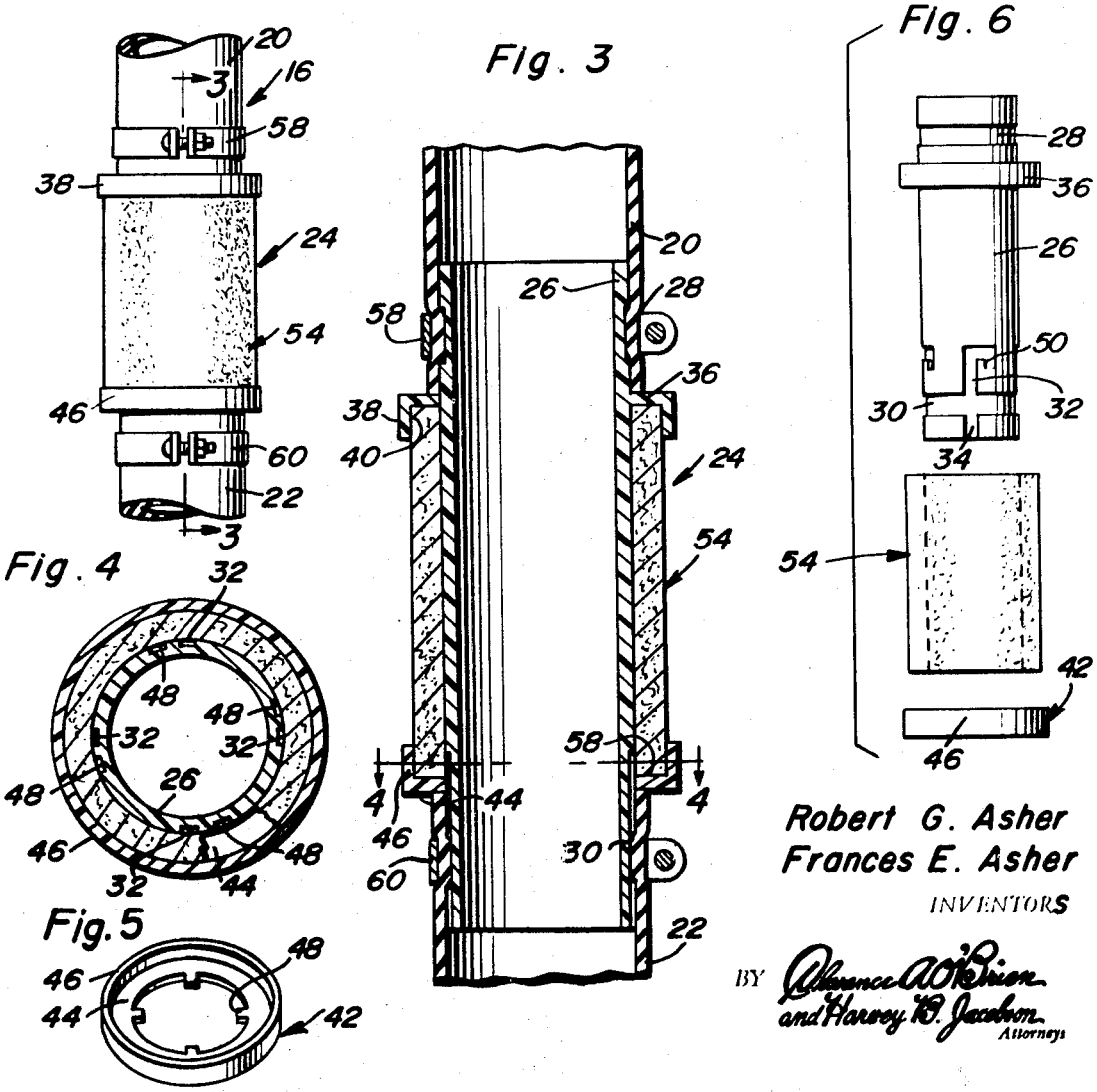
Robert G. Asher
Frances E. Asher
INVENTORS
BY Clarence A. O'Brien
and Harvey B. Jacobson
Attorneys

INSECT AND RODENT BAND

The insect- and rodent-repellent structure of the instant invention is designed primarily for use on sewer lines extending downwardly from a camping vehicle such as a house trailer to a ground sewer pipe and functions to prevent access to the camping vehicle by insects and rodents on the ground. It is of course also envisioned that the insect- and rodent-repellent band may also be utilized on other conduits such as water lines and also, when modified, on electrical lines. Further, in heavily infested areas it may also be necessary to use, in conjunction with the insect- and rodent-repellent band of the instant invention, additional insect- and rodent-repellent structures for preventing the access of rodents and insects to the camping vehicle over the running gear of the vehicle.

The main object of this invention is to provide a means whereby rodents and insects will be prevented from gaining access to camping vehicles by way of conduits extending downwardly from the camping vehicles to the ground.

Another object of this invention, in accordance with the immediately preceding object, is to provide an apparatus which may be readily interposed in substantially any vehicle-to-ground conduits utilized on camping vehicles.

Still another object of this invention is to provide an insect- and rodent-repellent structure provided with an absorbent portion thereof for soaking in insecticide or rodent repellent and which may be readily removed for soaking or replacement, when desired.

A final object of this invention to be specifically enumerated herein is to provide a rodent- and insect-repellent band in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side elevational view of a camping vehicle with the insect- and rodent-repellent band of the instant invention interposed in a semirigid sewer line of the vehicle;

FIG. 2 is an enlarged fragmentary side elevational view of the portion of the sewer line in which the insect- and rodent-repellent band is interposed;

FIG. 3 is an enlarged fragmentary sectional view taken substantially upon the plane indicated by the section line 3—3 of FIG. 2;

FIG. 4 is a horizontal sectional view taken substantially upon the plane indicated by the section line 4—4 of FIG. 3 and with a portion of the absorbent band being broken away;

FIG. 5 is a perspective view of the removable band retaining element;

FIG. 6 is an exploded elevational view of the instant invention; and

FIG. 7 is a fragmentary side elevational view of a second camping vehicle illustrating the manner in which the insect- and rodent-repellent band may be interposed in a flexible sewer line.

Referring now more specifically to the drawings, the numeral 10 generally designates a camping vehicle such as a house trailer. The trailer 10 includes a body 12 supported by running gear referred to in general by the reference numeral 14 and a semirigid sewer line referred to in general by the reference numeral 16 extends downwardly from the body 12 to the ground 18 upon which the vehicle 10 rests. The sewer line 16 includes an upper section 20 and a lower section 22 between which the insect- and rodent-repellent band assembly of the instant invention is disposed. The assembly is referred to in general by the reference numeral 24 and includes a tubular body 26 of substantially rigid material such as plastic.

The opposite ends of the body 26 have shallow circumferential grooves 28 and 30 formed therein and the end of the body 26 in which the groove 30 is formed also includes a plurality of shallow J-shaped grooves 32 including corresponding ends 34 which open axially of the corresponding end of the tubular body 26.

The end of the body 26 adjacent the groove 28 includes a circumferentially extending and radially outwardly projecting flange 36 whose outer periphery terminates in a cylindrical flange portion 38. The flange 36, the flange portion 38 and the adjacent portions of the body 26 define a channel 40 extending circumferentially about the body 26 and opening toward the remote end thereof.

A ring structure referred to in general by the reference numeral 42 is provided and includes an annular flange 44 whose outer periphery terminates in a cylindrical flange portion 46. The flange 44 and flange portion 46 correspond to the flange 36 and the flange portion 38 and it may be seen that the inner periphery of the flange 44 includes four inwardly projecting tongues 48. The tongues 48 are receivable in the ends 34 of the grooves 32 and may be slid upwardly in the grooves 32 and then seated in the inner ends 50 of the grooves 32 upon slight rotation of the structure 42 relative to the body 26.

A cylindrical band element referred to in general by the reference numeral 54 is provided and is constructed of absorbent material.

When assembling the insect- and rodent-repellent band assembly in the sewer line, the end portion of the tubular body 26 in which the groove 28 is formed is telescoped upwardly in the outlet end of the upper section 20 of the sewer line 16. Then, a clamp structure 58 is tightened about he portions of the upper section 20 registered with the groove 28 so as to radially inwardly displace the upper section 20 into the groove 28. Then, the inlet end of the lower section 22 is telescoped onto the end of the tubular body 26 in which the groove 30 is formed and a second clamp structure 60 is clamped about the lower section 22 so as to radially inwardly displace the portions thereof registered with the groove 30 into the groove 30.

However, before the lower section 22 is secured to the tubular body 26, the band element 24 is soaked in a suitable insect- and/or rodent-repellent and telescoped onto that portion of the body 26 immediately below the flange 36 with the upper axial end of the band element 54 seated in the channel 40. Then, the structure 42 is applied to the lower end of the tubular body 26 so that the projections 48 are seated in the closed ends 50 of the grooves 32 with the lower axial end of the band element 54 seated in the channel 58 corresponding to the channel 40 and defined by the structure 42 in the adjacent outer surface portions of the tubular body 26. After the assembly 24 has been installed, it will prevent the movement of insects and rodents upwardly along the sewer line 16 to the body 12 of the vehicle 10.

With the attention now directed more specifically to FIG. 7 of the drawings, there will be seen a second camping vehicle referred to in general by the reference numeral 10' and which includes a flexible sewer line referred to in general by the reference numeral 16'. An assembly referred to in general by the reference numeral 24' and corresponding exactly to the assembly 24 is interposed in the sewer line 16' in exactly the same manner in which the assembly 24 is interposed in the sewer line 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. c

What is claimed as new is as follows:

1. In combination, a camping vehicle including a vehicle-to-ground conduit, a band encircling said conduit in position spaced from said vehicle and the ground and axially shiftable along said conduit, said band being constructed of fluid-absorbent material, whereby an insecticide or repellent may be applied thereto to prevent the passage of insects or rodents from the ground to the camping vehicle along said conduit, said conduit including longitudinally spaced first and second means defining outstanding circumferential channels opening along said conduit toward each other and in which the opposite axial end portions of said band are seated, one of said means being shiftable relative to the other means along said conduit away from the other means for freeing the axial ends of said band from within said channels, and means releasably retaining said one means in axially shifted position along said conduit against movement away from the other of said first and second means.

2. In combination, a camping vehicle including a vehicle-to-ground conduit, a band encircling said conduit in position spaced from said vehicle and the ground, said band being constructed of fluid absorbent material, whereby an insecticide or repellent may be applied thereto to prevent the passage of insects or rodents from the ground to the camping vehicle along said conduit, said conduit including longitudinally spaced first and second sections and a third intermediate section to whose opposite ends adjacent ends of said first and second sections are sealingly secured, one end portion of said third section including first means defining a first outstanding circumferential channel opening toward the other end portion of said third section and said other end portion of said third section including second means defining a second outstanding circumferential channel opening toward said one end portion of said third section, said band including opposite axial end portions seated in said channels.

3. The combination of claim 2 wherein said second means is shiftable longitudinally of said third section between a first operative position with the axial ends of said band seated in said channel and a second position spaced further away from said first means sufficiently to enable the axial ends of said band to be fully withdrawn from said channels.

4. The combination of claim 3 wherein said second means is fully displaceable off the end of said intermediate section remote from said first means so as to enable said band, if continuous to be axially withdrawn from the same end of said intermediate section.

5. The combination of claim 2 wherein said intermediate section is constructed of rigid material and said adjacent ends of said first and second sections are telescoped over the ends of said intermediate section.

6. The combination of claim 2 wherein said adjacent ends of said first and second sections are constructed of somewhat deformable material, said opposite ends of said third section having shallow circumferential grooves formed in the outer surface portions thereof over which said adjacent ends are telescoped, and clamp means clamped about said adjacent ends and at least partially radially inwardly displacing the underlying portions of said adjacent ends into said grooves.

7. The combination of claim 2 wherein said second means is shiftable longitudinally of said third section between a first operative position with the axial ends of said band seated in said channel and a second position spaced further away from said first means sufficiently to enable the axial ends of said band to be fully withdrawn from said channels, said second means and said intermediate section including means defining a releasable bayonet connection therebetween for retaining said second means in said first position.

8. The combination of claim 2 wherein said intermediate section is generally vertically disposed.

9. The combination of claim 2 wherein said intermediate section is generally horizontally disposed.

10. In combination with claim 1 wherein said one means includes a ring structure disposed about said conduit and coacting with the latter to define the corresponding channel, the outer surface of said conduit forming the inner wall of said channel and said ring structure defining the outer and bottom walls of said corresponding channel.